United States Patent [19]

Nohren, Jr. et al.

[11] Patent Number: 4,695,379

[45] Date of Patent: Sep. 22, 1987

[54] WATER TREATMENT APPARATUS

[75] Inventors: John E. Nohren, Jr., St. Petersburg; Richard T. Downes, Clearwater, both of Fla.

[73] Assignee: Innova/Pure Water Inc., Clearwater, Fla.

[21] Appl. No.: 822,238

[22] Filed: Jan. 24, 1986

[51] Int. Cl.$^4$ .......................................... B01D 27/02
[52] U.S. Cl. .................................. 210/282; 222/481
[58] Field of Search ............... 210/238, 282, 290, 291; 222/478, 481, 547, 564, 566, 568, 570, 575; 239/377, 524

[56] References Cited

U.S. PATENT DOCUMENTS

| 1,834,045 | 12/1931 | Breuil | 210/282 |
| 1,976,635 | 10/1934 | Rothfus | 239/377 |
| 2,372,466 | 3/1945 | Zvolanek | 239/377 |
| 3,220,555 | 11/1965 | Silha | 210/282 |
| 3,392,837 | 7/1968 | Sanzenbacher | 210/282 |
| 4,402,427 | 9/1983 | Muskovin et al. | 222/481 |
| 4,605,499 | 8/1986 | Wise | 210/282 |

FOREIGN PATENT DOCUMENTS

| 729314 | 7/1932 | France | 210/282 |
| 795248 | 5/1958 | United Kingdom | 210/282 |

Primary Examiner—Ivars Cintins
Attorney, Agent, or Firm—Nixon & Vanderhye

[57] ABSTRACT

Contaminants in normal drinking water may be easily and effectively reduced. An elongated tube has first and second ends and is connected with an interference fit at its first end to the interior surface of a neck of a conventional bottle. Water treatment media is disposed within the tube adjacent its second end, such as activated charcoal, silver impregnated media, ion exchange resins, or calcium and/or magnesium leaching material. The tube includes a flange adjacent its first end which minimizes the possibility that water will enter the bottle except by flowing through the open first end of the tube. A cap is provided for disposition over the tube, the cap sealing the open first end of the tube to prevent water from flowing through it, and the cap apertured substantially 360 degrees around its circumference to allow free flow of water from the bottle which has already been treated by the treatment media.

21 Claims, 14 Drawing Figures

WATER TREATMENT APPARATUS

BACKGROUND AND SUMMARY OF THE INVENTION

There are many areas across the country that have significant amounts and types of contaminants in their drinking water. It, of course, is desirable to remove contaminants if possible, however there have been a number of difficulties associated with producing a device that will remove a wide variety of target contaminants quickly and simply, and in an inexpensive manner.

According to the present invention, a water treatment apparatus is provided which is simple and inexpensive to manufacture, simple and easy to use, and successfully removes a wide variety of, or any desired specific, contaminants normally present in tap water. The apparatus cooperates with a conventional common household container such as an empty milk bottle or juice jug, or like plastic or glass bottles, and ensures that only treated water is dispensed from the container once it is filled with water which is treated by the apparatus.

The three basic components of the apparatus according to the invention comprise an elongated tube, a cartridge containing water treatment media, and a cap.

The tube, which commonly would be of plastic, has open first and second ends. Adjacent its open first end it has a plurality of projections extending radially from it, which projections are spaced from each other circumferentially around the tube, and which are adapted to make an interference fit with the interior surface of the neck of a conventional bottle or the like. A radially outwardly extending flange is also provided on the top of the projections, the flange minimizing the possibility that water will enter the bottle except by flowing through the open first end of the tube. The components are dimensioned so that liquid from within the bottle can flow between the interior surface of the bottle neck and the exterior surface of the tube, around the projections and past the flange, to be dispensed.

The water treatment media can comprise any of a wide variety of water treatment media such as activated carbon (or like material to remove organic materials), silver impregnated coral sand (or like media) to destroy bacteria, ion exchange resins for removing sodium or other specific ionic materials, and/or materials which leach magnesium and calcium back into the water. Media typically would be disposed within a cartridge, and the cartridge inserted into the tube adjacent the second end thereof.

The cap cooperates with the exterior surface of the bottle neck, and is adapted to close off the tube first end while allowing passage of liquid from within the bottle between the tube and the neck. The cap includes an upper portion axially spaced from and substantially co-extensive with a lower portion, the lower portion having a plurality of arcuately shaped openings therein which are circumferentially spaced from each other around substantially 360 degrees. The upper and lower portions are spaced from each other a distance sufficient to allow liquid to flow through the openings in the lower portion top surface and to the space between the upper portion and the lower portion, and then away from the cap. The cap is affixed to the outer surface of the bottle neck by screw threads, cooperating snap rings, or the like. The cap typically would be made of high density polyethylene.

It is the primary object of the present invention to provide a simple yet effective water treatment apparatus which may be simply and inexpensively used for removing contaminants from drinking water. This and other objects of the invention will become clear from an inspection of the detailed description of the drawings, and from the appended claims.

DETAILED DESCRIPTION OF THE DRAWINGS

Figure 1:
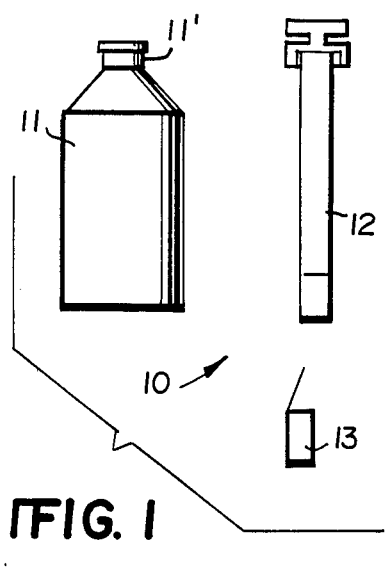
FIG. 1 is a side schematic view illustrating a water treatment device according to the present invention, and a bottle with which it is adapted to be utilized.
Figure 2:
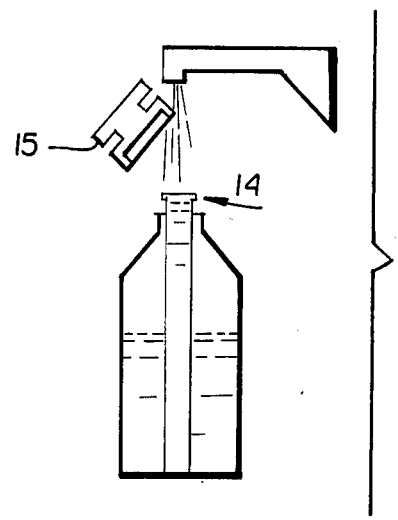
FIG. 2 is a side schematic view showing the device of FIG. 1 in use with a bottle during the filling of the bottle, and with the cap of the device removed.

An exemplary water treating device according to the present invention is illustrated generally by reference numeral 10 in the drawings, and it is adapted to be utilized in association with a conventional container such as the bottle 11 which has a neck 11'. The bottle 11 typically would be of glass or plastic.

Figure 8:
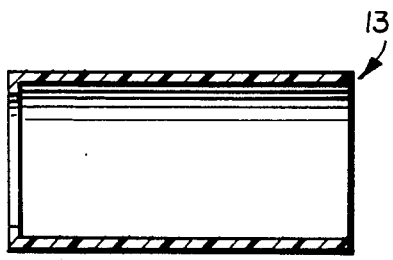
FIG. 8 is a side cross-sectional view of the cartridge of the device of FIG. 1.
Figure 9:
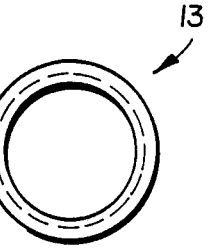
FIG. 9 is a bottom plan view of the cartridge of FIG. 8.

The major components of the device 10 comprise the tube 12, which is seen most clearly in FIGS. 4 through 7, a cartridge 13 for the water treatment media, which is seen most clearly in FIGS. 1, 8, and 9, and a cap 15 which may be seen most clearly in FIGS. 2 and 10 through 13. There is a configuration of flange and projections, shown generally by reference numeral 14, at a first end of the tube 12.

Figure 4:
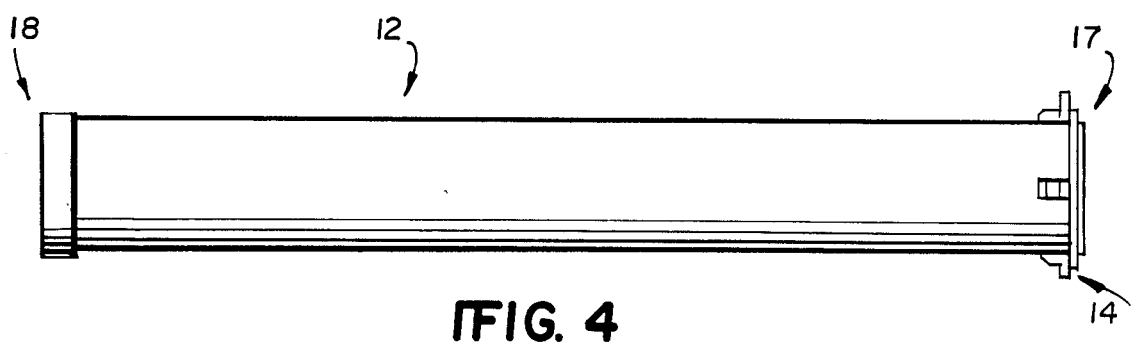
FIG. 4 is a side view of the elongated tube component of the device of FIG. 1.
Figure 6:
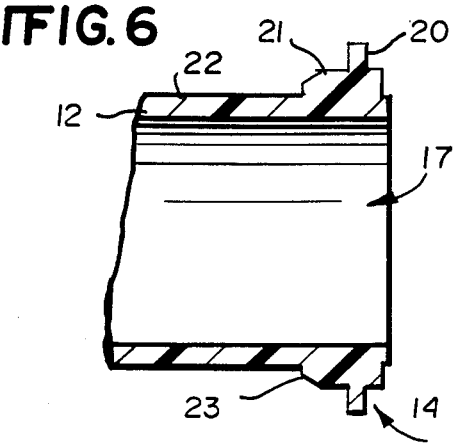
FIGS. 6 and 7 are cross-sectional views of the tube of FIG. 5, taken along lines 6—6 and 7—7 thereof.
Figure 7:
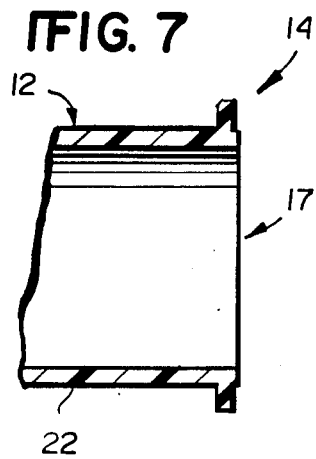
Figure 10:
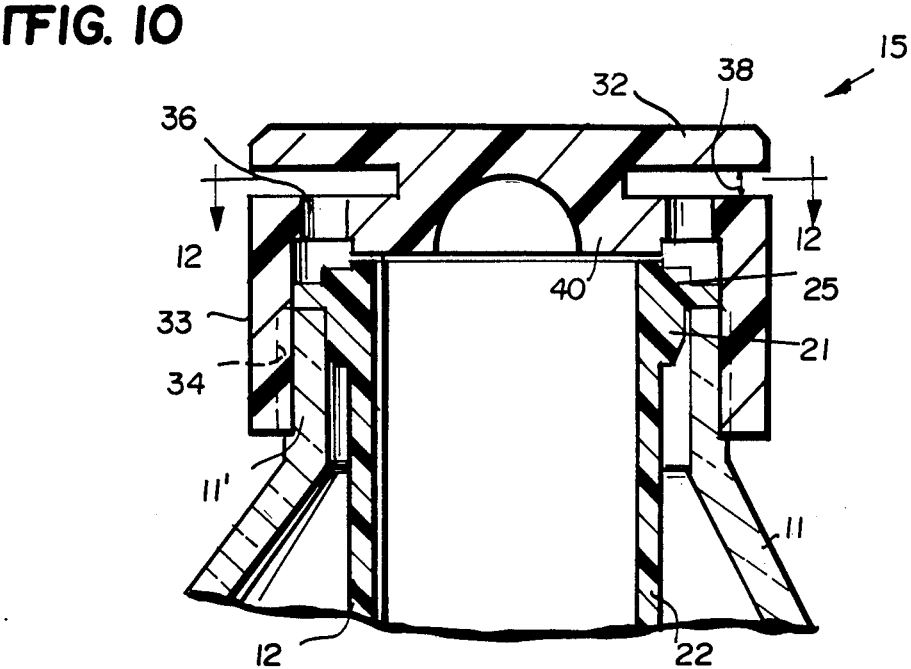
FIG. 10 is a side cross-sectional view of the assembled device according to the invention in association with a bottle, the cross-section being taken at the area of the tube wherein it has an interference fit with the bottle.

The hollow tube 12, which typically would be made of plastic, has open first and second ends shown generally by reference numerals 17 and 18, respectively, in FIGURE 4. Adjacent the first open end 17 there is provided the flange and projection construction 14. This construction preferably comprises a plurality (four in the exemplary embodiment illustrated in the drawings) of inverted L-shaped projections 19 which each have the L portion 20 thereof extending generally horizontally and adapted to abut the top of a bottle 11 at its neck 11' (as seen in FIG. 10), and having the leg portion 21 of the L extending radially a sufficient distance from the exterior surface 22 of the tube 12 so that it forms an interference fit with the bottle 11 at the neck 11'. The bottom of the leg 21 is typically tapered, as illustrated by reference numeral 23 in FIG. 6, as by having a 30 degree angle, so that as the tube 12 is inserted into the bottle the tapered portions 23 will help locate and position the projections 19 within the bottle.

Figure 5:
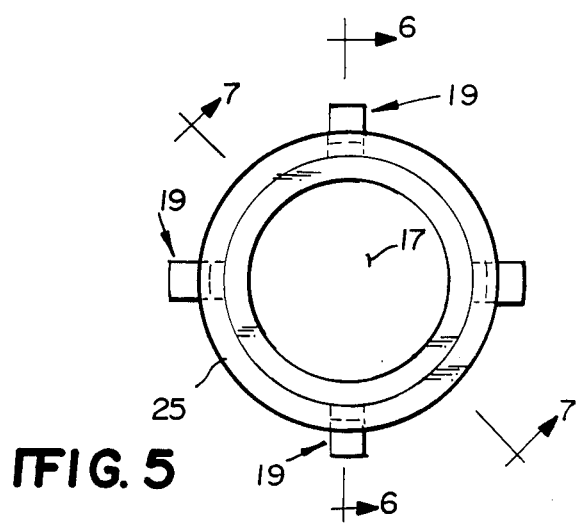
FIG. 5 is a top plan view of the tube of FIG. 4.

Located "above" the plurality of attaching projections 19 is a flange 25 which is circumferentially continuous around the tube 12, as seen most clearly in FIG. 5. The flange 25 assists—when the bottle 11 is being filled with liquid such as water from a faucet 30—see FIG. 2—in preventing the water from entering the bottle 11 except through the open end 17 of the tube 12. However the flange 25 does allow water to flow between the interior surface of the neck 11' and the exterior surface 22 of the tube 12, as can be seen by the flow arrows indicated in FIG. 11.

Located adjacent the second end of the tube 12, within the tube 12, is the water treatment media. The water treatment media preferably is provided within a cartridge 13, which cartridge 13 preferably is also of plastic. A screen (not shown) at the distal end of cartridge 13 prevents the media from flowing into the bottle 11 with the treated water.

The water treatment media may be any one or more of the following, in various tiers or levels of water treatment media may be provided: activated carbon, or like material for the removal of organics from the water; silver impregnated coral sand, or other media, or other bacteriastatic material, for destroying bacteria within the water; ion exchange resins (such as hydrogen based cation exchange resin for the removal of sodium) for removal ionic materials from the water; and/or materials which leach magnesium and/or calcium back into the water. With respect to the last material, since sodium ion exchange softening often results in the removal of magnesium and calcium from the water, and since those ions are desirable in the water, the water is "reconstituted". Of course if a mixed ion exchange resin bed is provided as a water treatment media within the cartridge 13, the calcium and magnesium leaching material would be provided downstream of the ion exchange resin.

Note that any variety of water treatment media desired could be disposed within the tube 12, so that it would be useful for treating water for use in steam irons, batteries, and other devices which can desirably employ deionized water.

The cap 15 is preferably of high density polyethylene, or a like plastic (that is one having properties generally comparable to those of high density polyethylene). The cap performs a number of functions, but primarily serves to seal off the open end 17 of the tube 12 during pouring so that only liquid which has been treated by the media within the cartridge 13 will be dispensed from the container 11.

The cap 15 includes a lower portion 31 thereof and an upper portion 32 thereof. The lower portion is generally cylindrical in configuration including a continuous side element 33 which preferably has internal screw threads, shown generally by reference numeral 34 in FIGS. 10 and 11, associated therewith which cooperate with external screw threads (not shown) disposed on the neck 11' of the container 11. The lower portion 31 also includes a top surface 35 which has means defining a plurality of openings 36 therein (see FIGS. 10 through 12) through which openings liquid being poured flows. As illustrated in FIG. 12, each of the openings 36 is circumferentially spaced from the others, for example each opening 36 may cover an arc of about 20 degrees, with about 20 degrees between the major portions of the openings 36, and the collective openings 36 extend substantially 360 degrees around the circumference of the top surface 35 so that liquid can be poured through the cap 15 irrespective of the orientation of the cap with respect to the bottle.

Figure 14:
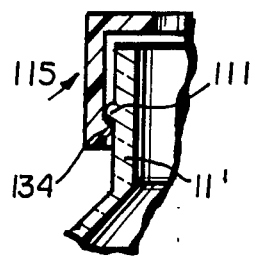
FIG. 14 is a side schematic cross-sectional view of a modified form of device which employs snap rings to hold the cap onto the bottle.

Instead of screw threads, snap rings (not shown), or the like, may be provided as projections for holding the cap on the bottle. FIG. 14 schematically illustrates a cap 115 with snap rings 134 cooperating with a like circumferentially continuous snap ring 111 on the bottle neck 11'.

Figure 11:
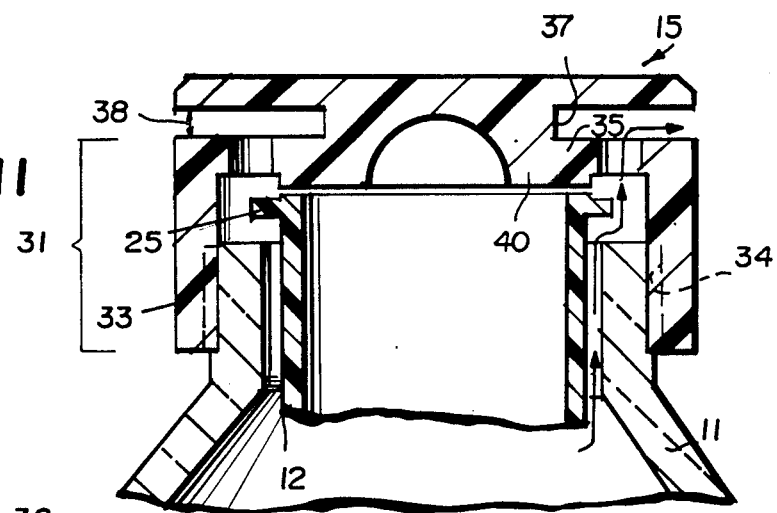
FIG. 11 is a view like that of FIG. 10 only the cross-section taken at the area of the tube wherein the interference-fit providing projections are not provided.
Figure 12:
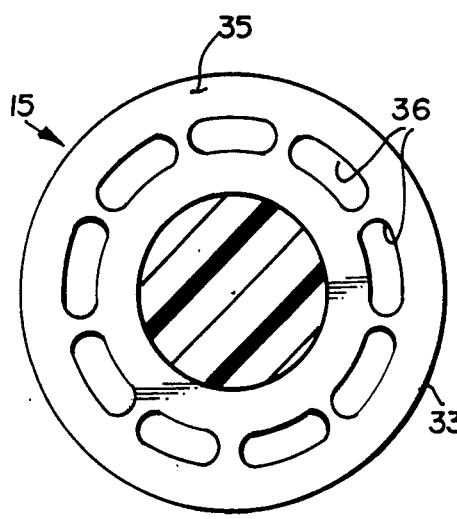
FIG. 12 is a cross-sectional view of the cap of the device of FIG. 10 taken along lines 12—12 thereof.

Note that an integral intermediate stem portion 37 is provided which interconnects the top portion 32 and the lower portion 31, there being a spacing—shown generally by reference numeral 38 in FIG. 11—between the portions 31, 32 sufficient to allow liquid to flow therebetween. The upper portion 32 is substantially co-extensive with the lower portion 31, and covers the openings 36 so that contaminants cannot enter the treated water through the top of the cap.

The central portion of the top surface 35, denoted by reference numeral 40 in FIGS. 10 and 11, engages the top surface of the tube 12 adjacent the first end 17 thereof and seals it (see FIGS. 10 and 11) so that water may not flow from the interior of the tube 12 to the openings 36. Due to the material of which the cap 15 is made, and/or the material of the tube 12, and the tolerances between the components, the seal is tight enough to essentially prevent any flow of liquid from the interior of the tube 12 to the openings 36.

Figure 13:
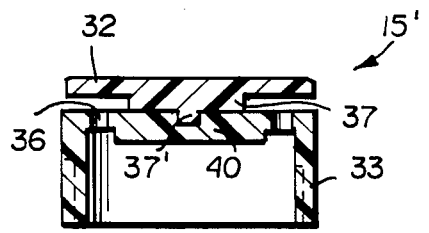
FIG. 13 is a side cross-sectional view of a modified form of cap according to the present invention.

FIG. 13 shows an alternative construction of a cap 15' according to the invention. This construction is the same as that of the cap of the other figures of drawing except that the upper portion 32 of the cap is removable, there being a peg 37' which provides a connection between the stem portion 37 and the central sealing portion 40. By grasping the upper portion 32 and pulling upwardly, the portion 32 may be detached from the central portion 40 by the peg 37' being pulled out of the hole for it formed in the central portion 40, and by the reverse action it may be snapped into place.

Operation:

Exemplary apparatus according to the present invention having been described, an exemplary manner of the use thereof will now be set forth with regard to the FIGS. 1-12 embodiment:

The cartridge 13 is filled with a suitable water treatment media, such as activated charcoal, and is inserted into the second end 18 of the tube 12 so that it is disposed in place within the tube 12, or slips over the exterior of the tube 12, depending upon the relative diameters of the components. Alternatively the cartridge 13 may have an interior diameter substantially the same as the exterior diameter of the tube at end 18, and they are joined together by matching tapered edges.

The tube 12 is then inserted into the bottle 11, the second end 18 thereof passing through the neck 11' of the bottle 11, and insertion continuing until the projections 19 engage the interior surface of the neck 11, providing an interference fit therewith, and the cross portion of each "L", 20, engages the top of the neck 11'. This structure, with the cap 15 removed, is then filled with water, as from a faucet 30 (see FIG. 2), the water passing through the tube 12, and the media within the cartridge 13, which treats the water, and the water then flowing to the interior of the bottle 11. The flange 25 substantially prevents any liquid from flowing into the bottle 11 between the exterior surface 22 of the tube 12 and the interior of the neck 11'.

After a sufficient volume of water has been introduced into the bottle 11, the cap 15 is disposed on top of the bottle by placing the lower portion 31 thereof over the bottle neck 11', and then screwing the cap 15 into place. Screwed down completely, the central portion 40 of the cap 15 will abut and seal the top of the tube 12 adjacent the open end 17 thereof.

Figure 3:
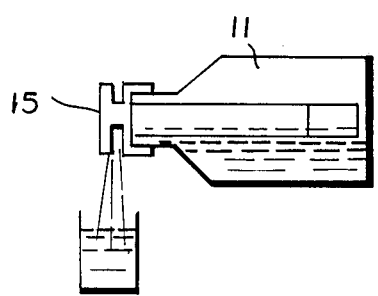
FIG. 3 is a side schematic view of the device and bottle of FIG. 1 as utilized for pouring treated liquid out of the bottle.

When it is desired to use the treated drinking water within the bottle 11, as illustrated in FIG. 3 the bottle is merely turned over to pour the liquid out of the top, the liquid passing, as illustrated by the flow arrows in FIG. 11 and as illustrated schematically in FIG. 3, between the exterior surface 22 of the tube 12 and the interior of the neck 11' of the bottle, past the flange 25, through openings (one or more openings) 36, into the space 38 between the cap portions 31, 32, and completely out of the bottle.

Because the openings 36 are provided around the complete circumference of the cap 15, it does not make any difference what the orientation of the bottle is during pouring.

It will thus be seen that according to the present invention a simple, inexpensive, yet effective water treatment apparatus has been provided for treating water for drinking, household use, and the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. In combination with a bottle having a neck with an interior surface and an exterior surface:
    an elongated tube having first and second ends, said first end having means for operatively connecting said tube to said interior surface of said bottle neck;
    water treatment means disposed within the interior of said tube for treating water passing through said tube; and
    cap means for cooperating with the exterior surface of said neck and closing off said tube first end while allowing passage of liquid from within the bottle between the tube and the neck so that it may flow out of the bottle.

2. Apparatus as recited in claim 1 wherein said cap means allows passage of liquid therethrough substantially at any point around a 360 degree circumference thereof.

3. Apparatus as recited in claim 1 wherein said cap means operatively connects to the exterior surface of said bottle by a screw-threaded connection.

4. Apparatus as recited in claim 1 wherein said tube connects at the first end thereof to the interior surface of said bottle by a plurality of projections which are spaced from each other circumferentially around the first end of said tube, and make an interference fit with the interior surface of said bottle.

5. Apparatus as recited in claim 1 wherein said cap means is constructed of a plastic material.

6. Apparatus as recited in claim 1 wherein the first end of said first tube includes a radially outwardly extending flange which is disposed above, and spaced from, the inner surface of the bottle neck and which minimizes the possibility that water will enter the bottle except by flowing through the open first end of the tube.

7. Apparatus as recited in claim 1 wherein said cap means comprises an upper portion axially spaced from and substantially co-extensive with a lower portion, the lower portion having means defining a plurality of openings in a top surface thereof underlying said top portion, said openings being circumferentially spaced form each other around said cap; said upper and lower portions being spaced from each other a distance sufficient to allow liquid to flow through said openings in said lower portion top surface into the space between said upper portion and said lower portion, and then away from said cap.

8. Apparatus as recited in claim 1 wherein said water treatment means disposed within said tube comprises a cartridge containing a water treatment media, said cartridge and said tube at said second end joined together.

9. Apparatus as recited in claim 8 wherein the water treatment media within said cartridge is selected from the group consisting essentially of activated carbon, silver impregnated media, ion exchange resins, materials which leach calcium and/or magnesium into water, and combinations of activated carbon, silver impregnated media, ion exchange resins, and calcium and/or magnesium leaching material.

10. A water treatment apparatus for attachment to a bottle provided with an opening at a neck portion thereof, said apparatus comprising:
    an elongated tube having first and second open ends;
    attachment means disposed adjacent said first end of said tube for providing an interference fit between said tube and the interior surface of the neck of the container; and said attachment means being circumferentially discontinous;
    flange means associated with said tube adjacent said first ends thereof, said flange means being substantially circumferentially continuous around said tube and extending radially outwardly therefrom, said flange means disposed adjacent said first end of said tube and between the first end of said tube and said attaching means; and
    cartridge means containing water treatment media, said cartridge means joined with said tube adjacent said second end thereof.

11. Apparatus as recited in claim 10 wherein the water treatment media within said cartridge is selected from the group consisting essentially of activated carbon, silver impregnated media, ion exchange resins, materials which leach calcium and/or magnesium into water, and combinations of activated carbon, silver impregnated media, ion exchange resins, and calcium and/or magnesium leaching material.

12. Apparatus as recited in claim 10 wherein said attachment means comprises a plurality of inverted L-shaped components spaced circumferentially around said tube adjacent said first end thereof.

13. Apparatus as recited in claim 12 wherein each of said inverted L-shaped components include a horizontally extending part for abutting the top rim of the bottle, and a leg portion for engaging the interior surface of the bottom at the neck thereof, and having an interference fit therewith; and wherein said circumferentially continuous flange is spaced from the top of the bottle, and the majority of the length of the tube is spaced from the interior surface of the neck of the bottle, so that liquid may freely flow from the interior of the bottle between the tube interior surface of the neck of the bottle, past the flange, but when liquid is being introduced into the tube at the open first end thereof said flange substantially prevents liquid from passing into the bottle except through said tube.

14. Apparatus as recited in claim 13 in combination with removable cap means for capping said tube, said cap comprising a lower portion having a cylindrical surface which engages an outer surface of the bottle at the neck thereof, and having an upper portion, said upper portion having an interior portion which forms a seal with the open first end of said tube to prevent liquid from flowing from the interior of said tube through the open first end of said tube, and means defining a plurality of circumferentially spaced openings around an outer portion of said top portion, said openings allowing free flow of liquid from the interior of said container around past the exterior of the tube.

15. Apparatus as recited in claim 14 wherein said cap means allows passage of liquid there-through substantially at any point around a 360 degree circumference thereof.

16. Apparatus as recited in claim 15 wherein said cap further comprises an upper portion, said upper portion being substantially integral with said lower portion top portion at the center thereof, and being spaced from said lower portion around the periphery thereof so that liquid may freely flow through the openings in said cap between said upper portion and lower portion.

17. Apparatus as recited in claim 16 wherein said cap is of a plastic material having properties generally comparable to those of high density polyethylene.

18. A cap for use with water treatment apparatus wherein the cap is adapted to cooperate with an open neck of a bottle having an exterior projection formed on the neck thereof, said cap comprising:

a lower component having a circumferentially continuous portion which has an interior projection adapted to cooperate with the exterior projection of the bottle; a top portion of said lower component, said top portion having a central part which is non-apertured, and having a peripheral part which has a plurality of circumferentially spaced through-extending openings therein, said openings disposed substantially 360 degrees around the circumference of said cap; and said cap having an upper component which is affixed to said lower component at a central portion thereof, and is axially spaced from said lower component around the periphery thereof so that liquid may freely flow through the openings in said lower component top part, and then between the upper component and the lower component under the force of gravity.

19. Apparatus as recited in claim 18 wherein said upper component is releasably connected to said lower component.

20. Apparatus as recited in claim 18 wherein said projections on said cap and said bottle are cooperating screw threads.

21. Apparatus as recited in claim 18 wherein said projections on said cap and said bottle are snap rings.

* * * * *